United States Patent
Aurenty et al.

(10) Patent No.: US 6,455,132 B1
(45) Date of Patent: *Sep. 24, 2002

(54) LITHOGRAPHIC PRINTING PRINTABLE MEDIA AND PROCESS FOR THE PRODUCTION THEREOF

(75) Inventors: Patrice M. Aurenty, Wood-Ridge; Edward Stone, Morris Plains; William P. Keaveney, Pompton Plains, all of NJ (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/244,580

(22) Filed: Feb. 4, 1999

(51) Int. Cl.[7] .............................. B32B 3/00; B41M 3/12; B41N 3/00

(52) U.S. Cl. ...................... 428/195; 428/209; 428/458; 428/461; 427/152; 427/541; 101/457; 101/463.1; 101/465; 101/466

(58) Field of Search .................................. 428/458, 195, 428/448, 450, 453, 461, 209; 101/466, 465, 457, 463.1; 427/152, 541

(56) References Cited

U.S. PATENT DOCUMENTS 3,877,372 A  4/1975  Leeds .......................... 101/465

(List continued on next page.)

FOREIGN PATENT DOCUMENTS

| CA | 2107980 | 4/1994 |
|---|---|---|
| DE | 4330428 | 10/1994 |
| EP | 101266 | 2/1984 |
| EP | 071345 | 6/1985 |
| EP | 0 503 621 A1 | 9/1992 |
| EP | 0 738 608 A2 | 10/1996 |
| EP | 751194 | 1/1997 |
| EP | 829574 | 3/1998 |
| EP | 847868 | 6/1998 |
| EP | 882584 | 12/1998 |
| GB | 2332646 | 6/1999 |
| JP | 62059046 | 9/1988 |
| JP | 63224988 | 9/1988 |
| JP | 08329147 | 11/1996 |
| JP | 929926 | 2/1997 |
| JP | 9255765 | 9/1997 |
| JP | 10151852 | 6/1998 |
| WO | WO0046036 | 8/2000 |

OTHER PUBLICATIONS

E.I. Dupont de Nemours "Zonyl Surfactants" Production Information Bulletin.

Primary Examiner—Paul Thibodeau
Assistant Examiner—Monique R. Jackson
(74) Attorney, Agent, or Firm—Baker Botts L.L.P.

(57) ABSTRACT

A fluid composition suitable for ink jetting upon a substrate, which includes a copolymer having a low surface energy and a plurality of tertiary amine sites, where the tertiary amine sites are at least partially neutralized with an acid; a nonionic or cationic surfactant; and water. The fluid composition may be used to prepare a printable media comprised of a substrate and an ink receptive thermoplastic image layer supported on the substrate; where the ink receptive layer contains a copolymer having a low surface energy and a plurality of tertiary amine sites, the amine sites being at least partially neutralized with an acid. The invention also relates to a method for preparing a printable media by applying a fluid composition onto a substrate having at least one basic surface by means of an ink jet printing apparatus; where the fluid composition contains a copolymer having a plurality of tertiary amine sites, the amine sites being at least partially neutralized with an acid, and drying the fluid composition.

36 Claims, 1 Drawing Sheet

U.S. PATENT DOCUMENTS

| | | | |
|---|---|---|---|
| 4,278,467 A | 7/1981 | Fadner | 106/2 |
| 4,365,043 A | 12/1982 | Konishi et al. | 525/113 |
| 4,544,624 A * | 10/1985 | Nanpei et al. | 430/281 |
| 4,781,985 A | 11/1988 | Desjarlais | 428/421 |
| 4,833,486 A | 5/1989 | Zerillo | 346/1.1 |
| 4,854,969 A | 8/1989 | Bassemir et al. | 106/2 |
| 4,954,395 A | 9/1990 | Hasegawa et al. | 428/318.4 |
| 5,096,781 A | 3/1992 | Vierira et al. | 48/411.1 |
| 5,141,556 A | 8/1992 | Matrick et al. | 106/20 |
| 5,266,443 A * | 11/1993 | Higashi et al. | 430/272 |
| 5,364,702 A | 11/1994 | Idei et al. | 428/423.1 |
| 5,478,631 A | 12/1995 | Kawano et al. | 428/212 |
| 5,551,585 A | 9/1996 | Huang et al. | 216/11 |
| 5,656,701 A | 8/1997 | Miyamoto et al. | 525/453 |
| 5,716,436 A | 2/1998 | Sorriero et al. | 106/31.87 |
| 5,773,194 A | 6/1998 | Hattori et al. | 430/284.1 |
| 5,820,932 A | 10/1998 | Hallman et al. | 427/261 |
| 5,821,283 A | 10/1998 | Hesler et al. | 523/161 |
| 5,900,345 A * | 5/1999 | Platzer et al. | 430/156 |
| 6,245,421 B1 * | 6/2001 | Aurenty et al. | 428/304.4 |

* cited by examiner

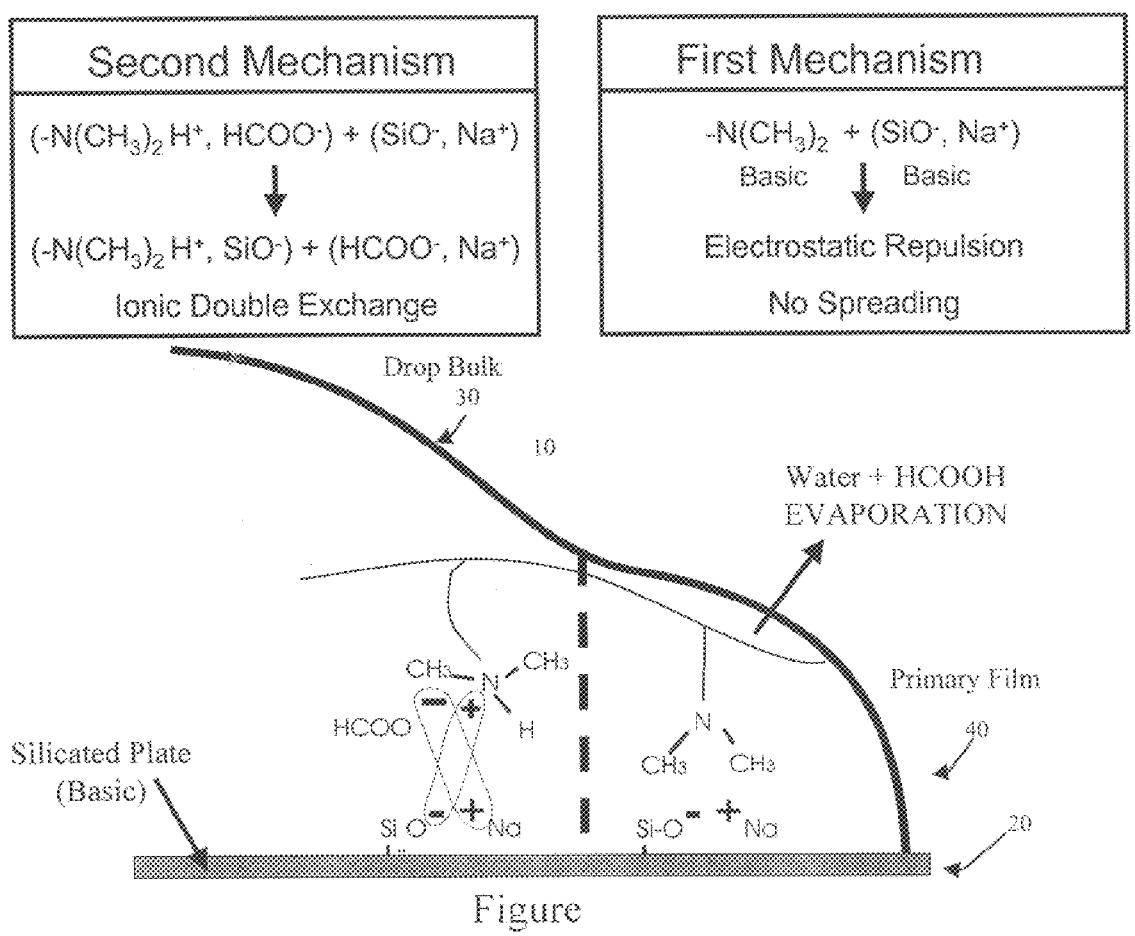
Figure

LITHOGRAPHIC PRINTING PRINTABLE MEDIA AND PROCESS FOR THE PRODUCTION THEREOF

FIELD OF THE INVENTION

The present invention relates to a printable media, such as a lithographic printing member, and an ink jet printing process for production thereof. Lithographic printing members of the present invention exhibit good resolution and are suitable for press runs of over 100,000 copies.

BACKGROUND OF THE INVENTION

The offset lithographic printing process utilizes a planographic printing plate having oleophilic image areas and hydrophilic non-image areas. The plate is commonly dampened before or during inking with an oil-based ink composition. The dampening process utilizes an aqueous fountain solution such as those described in U.S. Pat. Nos. 3,877,372, 4,278,467 and 4,854,969. When water is applied to the plate, the water will form a film on the hydrophilic areas (i.e. the non-image areas of the plate) but will contract into tiny droplets on the oleophilic plate areas (i.e. the image areas). When a roller carrying an oil-based ink composition is passed over the dampened plate, it will be unable to ink the areas covered by the aqueous film (the non-image areas), but will emulsify the water droplets or the water repellant areas (the image areas) which will then adsorb ink. The resulting ink image is transferred ("offset") onto a rubber blanket, which is then used to print a substrate such as paper.

Lithographic printing plates can be manufactured using a mask approach and a dye-based hot melt ink jet ink. For example, U.S. Pat. No. 4,833,486 discloses a dye-based hot melt ink composition which is jetted onto a conventional photopolymer plate. The deposited ink acts as a mask during plate exposure, and is removed from the plate together with the exposed photopolymer during development of the plate. This technique involves multiple processing steps such as UV-irradiation, chemical development and plate drying, which result in high production costs and environmental concerns.

It has been proposed to apply "direct" ink jet printing techniques to lithographic printing. For example, European Patent Publication No. 503,621 discloses a direct lithographic plate making method which includes jetting a photocuring ink onto the plate substrate, and exposing the plate to UV radiation to harden the image area. An oil-based ink may then be adhered to the image area for printing onto a printing medium. However, there is no disclosure of the resolution of ink drops jetted onto the substrate, or the durability of the lithographic printing plate with respect to printing runlength.

Canadian Patent No. 2,107,980 discloses an aqueous ink composition which includes a first polymer containing a cyclic anhydride or derivative thereof and a second polymer that contains hydroxyl sites. The two polymers are thermally crosslinked in a baking step after imaging of a substrate. The resulting matrix is said to be resistant to an acidic fountain solution of an offset printing process, and to be capable of providing a resolution (dot size) of 40 microns. The Examples illustrate production of imaged masters said to be capable of lithographic runlengths of from 35,000 to 65,000 copies, while a non-crosslinked imaged master exhibited a runlength of only 4,000 copies.

Both of these direct lithographic proposals require a curing step, and the Canadian patent illustrates the importance of this curing step to extended runlengths. The present invention eliminates the need for such a thermal or irradiation step while providing a direct lithographic master capable of a runlength of at least 100,000 copies.

Ink compositions intended for ink jet printers must be carefully formulated to satisfy demanding requirements, which include resistance to drying on the ink jet nozzles while stored in an ink jet print head, drying time, ink density and droplet spreading (expansion) once applied onto the printing substrate. These requirements can conflict. For example, the ink composition must not clog the small diameter nozzles of the ink jet printer over time. However, the ink must also be capable of rapid drying once it is applied to the printing substrate. In this regard, the drying time for a commercially available ink jet composition is less than one second, with an advertised resolution of 1,440 dots-per-inch. See generally, "Ink-jet Inks", *The Printing Ink Manual* (5th ed. 1993).

It is known to improve the resolution of ink jet printers by applying an ink receiving layer to substrates such as metal, plastic, rubber, fabrics, leather, glass and ceramics, prior to printing thereon. See, for example, European Patent Publication No. 738,608 which discloses a thermally curable ink receiving layer containing a first water soluble high molecular weight compound having a cationic site in the main polymer chain and a second water soluble high molecular compound having a side chain containing a condensable functional site. Alternatively, the second high molecular weight compound may be replaced with a monomer or oligomer having at least two (meth)acryloyl sites, which results in a UV radiation curable ink receiving layer. In either case, the cationic site of the first polymer is said to permit an ink solvent to readily penetrate the ink receiving layer. The ink receiving layer of the present invention does not require either a thermal or an irradiation curing step.

U.S. Pat. No. 5,364,702 discloses an ink-jet recording medium which contains at least one of acetylene glycol, ethylene oxide addition product and acetylene glycol and acetylene alcohol, each of which have a triple bond in its molecule. The ink receiving layer may also contain an inorganic pigment, a water-soluble polymeric binder, and a cationic oligomer or polymer. The present invention is directed to lithographic masters and employs a copolymer having a plurality of amine sites, which are at least partially neutralized with an acid.

U.S. Pat. No. 4,781,985 discloses an ink jet transparency which includes a substantially transparent resinous support, and a substantially clear coating thereon which contains a specified fluorosurfactant which serves to prevent trailing of the ink-jet ink. The substantially clear coating may be about 2–15 microns thick. The present invention is directed to a lithographic master rather than an ink jet transparency, and may employ a desorbable fluorosurfactant pretreatment applied as a monolayer.

U.S. Pat. No. 5,820,932 discloses a process for the production of lithographic printing plates. Ink jet liquid droplets form an image upon the surface of a printing plate corresponding to digital information depicting the image as provided by a digital computer system which is in digital communication with the printer heads. The droplets from the printer head comprise resin forming reactants which polymerize on the plate surface, alone or in combination with reactant precoated on the plate, to form a printable hard resin image. The resin image so formed provides a lithographic printing plate useful for extended print runs. In contrast, the present invention does not require polymerization of the fluid composition jetted upon the printable media substrate.

SUMMARY OF THE INVENTION

An object of the present invention is to provide a fluid composition which may be applied by an ink jet printing apparatus to directly image a substrate, and thereby produce a printable media.

Another object of the present invention is to provide a lithographic printing member capable of extended runlengths which exhibits good resolution and good ink transfer.

An advantage of the present invention is the elimination of the exposure and chemical development steps of conventional lithographic master printing plate manufacturing processes, thereby achieving lower production cost and an environmentally-friendly process.

In one aspect, the present invention relates to a fluid composition suitable for ink jetting upon a substrate, wherein the fluid composition includes a copolymer having a low surface energy and a plurality of tertiary amine sites, where the amine sites are at least partially neutralized with an acid; a nonionic or cationic surfactant; and water.

The invention also relates to a printable media which includes a substrate; and an ink receptive thermoplastic image layer supported on the substrate, where the ink receptive layer (i.e. image area) contains a copolymer having a low surface energy and a plurality of tertiary amine sites, the amine sites being at least partially neutralized with an acid.

Another aspect of the present invention is a process for preparing a printable media which includes applying a fluid composition onto a substrate having at least one basic surface by means of an ink jet printing apparatus, wherein the dried fluid composition becomes an ink receptive layer containing a copolymer having a plurality of tertiary amine sites, the amine sites being partially neutralized with an acid, and drying the fluid composition.

BRIEF DESCRIPTION OF THE DRAWING

The FIGURE illustrates theoretical mechanisms believed responsible for the improved properties exhibited by a lithographic printing plate produced by acid/base interfacial matching of a fluid composition to the substrate's surface.

DETAILED DESCRIPTION OF THE INVENTION

The applicants have discovered that a fluid composition can be applied by drop-on-demand ink jet printing techniques to a printable media substrate to produce a lithographic printing plate, eliminating the need for conventional exposure and development steps. This desirable result can be achieved by acid/base interfacial matching of a "basic" substrate with a fluid composition which contains a partially or completely neutralized "basic" polymer.

By "fluid composition" it is meant a composition that, when applied by an ink jet print head onto a basic surface of a substrate, will form an image layer which, when dried, will adhere to the substrate and will accept subsequent application of ink conventionally used in lithographic printing. The fluid composition thus must satisfy the demanding performance requirements of ink jet ink compositions discussed above.

As summarized above, the fluid composition of the present invention includes:
  (a) a copolymer having a low surface energy and a plurality of tertiary amine sites, where the tertiary amine sites are at least partially neutralized with an acid;
  (b) a nonionic or cationic surfactant; and
  (c) water.

The copolymer may be selected from the group consisting of polyacrylates, styrenated polyacrylates, polyamides and polyurethanes. Suitable polyacrylates and styrenated polyacrylates may be prepared from a comonomer having the following formula:

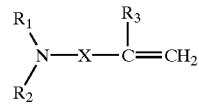

where $R_1$ is hydrogen or $C_{1-5}$ alkyl;

$R_2$ is $C_{1-5}$ alkyl;

$R_3$ is hydrogen or methyl;

X is —$C_6H_4$— or

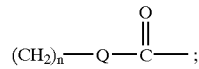

n is 2 to 6; and

Q is oxygen or N—H.

Illustrative comonomers include dimethylaminoethyl acrylate, dimethylaminoethyl methacrylate, diethylaminoethyl acrylate, diethylaminoethyl methacrylate, di(t-butyl) aminoethyl acrylate and di(t-butyl)aminoethyl methacrylate, acrylamides such as dimethylamino-propyl methacrylamide, and styrenes such as p-dimethylamino styrene, and diethylamino styrene.

The copolymer may also be a polyamide prepared from a comonomer having at least one tertiary amine site in its backbone.

Suitable comonomers include 1,4-bis(3-aminopropyl) piperazine and dialkyl 1,4-piperazinedipropionate.

The copolymer may also be a polyurethane prepared from a comonomer having the following formula:

$$HOH_2CH_2C-Z-CH_2CH_2OH$$

where Z is an aliphatic, cycloaliphatic or aromatic divalent radical which contains at least one tertiary amino group, with the proviso that the radical is bonded to the remainder of the comonomer structure by carbon-to-carbon bonds. Suitable comonomers which may be employed to prepare the copolymer include those which conform to the following formula:

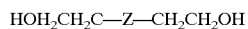

wherein

R is an aliphatic, cycloaliphatic or aromatic substituent, and u is 1 to 6. N-methyldiethanol amine is a suitable comonomer.

Comonomers which conform to the following formula may also be employed to prepare the copolymer:

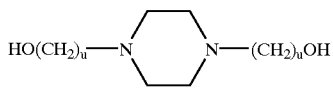

wherein u is 1 to 6.

The acid employed to partially or completely neutralize the amine sites of the copolymer should possess a relatively low molecular weight. Suitable acids conform to one of the formulae in the group consisting of H—$(CH_2)_n$—COOH and

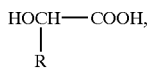

where

R is hydrogen, —$CH_3$ or —$CH_2CH_3$; and n is a number from 0 to 6.

Formic acid, acetic acid, lactic acid, and glycolic acid are preferred as the neutralizing acid, with formic acid being especially preferred.

The copolymer should have a maximum surface energy, as measured according to the Owens-Wendt method, as described in J. Appl. Pol. Sci., 13, pg. 1741 (1969), based on two liquid probes (water and diiodomethane), of 50 dynes/cm, preferably from 20 to 50 dynes/cm.

The second component of the fluid composition is a non-ionic or cationic surfactant which serves to lower the dynamic surface tension of the fluid composition so that it can be jetted upon a substrate by a conventional ink jet printer. The dynamic surface tension of the fluid composition may range from 20 to 60 dynes/cm, preferably from 32 to 44 dynes/cm. Acetylenic glycols, ethoxylated glycols, ethoxylated/propoxylated block copolymers and sorbitan esters are preferred surfactants.

The viscosity of the fluid composition should not exceed 20 centipoise at 25° C., and is preferably 1 to 10 centipoise, most preferably 1 to 5 centipoise.

The fluid composition preferably contains a humectant to ensure that it will retain water while the ink jet printer is idle. Suitable humectants include glycerol, ethylene glycol, diethylene glycol, triethylene glycol, propylene glycol, dipropylene glycol, tripropylene glycol, ethylene glycol monomethyl ether, diethylene glycol monomethyl ether, triechylene glycol monomethyl ether, and propylene glycol monomethyl ether, di-propylene glycol monomethyl ether, tripropylene glycol monomethyl ether, and combinations thereof.

The fluid composition may be prepared by mixing the appropriate amounts of copolymer and the non-ionic or cationic surfactant in deionized water. Thus, the fluid composition may preferably contain from 0.1 to 3 percent by weight of the copolymer, from 0.001 to 5 weight percent by weight of the surfactant, and from about 85 to about 99.9 percent by weight water, all based upon the total weight of the composition. It is even more preferred that the fluid composition contain from 0.1 to 2 weight percent by weight of the copolymer, from 0.05 to 1 weight percent of the surfactant, and from 97 to 99.9 weight percent water, based on the total weight of the composition. The humectant may be present in an amount of from 0.1 to 10 weight percent, preferably 1 to 3 weight percent, based on the total weight of the composition.

The fluid composition may also contain colorants, biocides, corrosion inhibitors and anti-foaming agents.

The fluid composition of the present invention can be applied to a suitable substrate to produce a high resolution, printable media having a desired image. It is especially preferred to prepare the printable media by using a conventional drop-on-demand ink jet printer to apply the fluid composition. Suitable ink jet printers include piezoelectric and bubble jet printers.

Suitable substrates include aluminum, polymeric film and paper. Preferably, the printing plate substrate has basic chemical sites on its surface, or is modified to have such basic chemical sites. For example, it is possible to coat the printing plate substrate with an interlayer containing a plurality of sodium silicate sites. If desired, the sodium silicate sites can be partially neutralized with an acid.

The substrate is preferably roughened by conventional chemical, electrochemical or mechanical surface treatments. A chemical roughening treatment is disclosed in U.S. Pat. No. 5,551,585, the disclosure of which is incorporated by reference herein in its entirety. It is known that the surface of the aluminum substrate may be made basic by contacting the aluminum with an aqueous silicate solution at a temperature between 20° C. and 100° C., preferably between 80 and 95° C.

Polymeric substrates such as polyethylene terephthalate or polyethylene naphthalate film can be coated with a hydrophilic subbing layer composed of, for example, a dispersion of titanium dioxide particles in crosslinked gelatin to provide a roughened surface. Alternatively, any of the conventional subbing materials, such as vinylidene chloride polymers, used to prepare photographic films may be used to render the polymeric substrate hydrophilic. Paper supports can be similarly treated and employed as printing plate substrates.

The fluid composition contains a basic copolymer which is partially or fully neutralized with an acid in order to "interfacially match" the basic surface of the printing plate substrate. It is preferred that the basic sites of the fluid composition's copolymer should be partially neutralized, thereby ensuring that both acidic and basic sites are present in the copolymer. The presence of both acidic and basic sites is believed to permit two different mechanisms (electrostatic repulsion and double salt replacement) to occur simultaneously. This "acid/base interfacial matching" theory is illustrated by the FIGURE and explained below.

Without intending to be bound by theory, it is generally accepted that a liquid droplet applied to a solid surface will spread as a very thin primary film in advance of the bulk of the liquid droplet. This is illustrated in the FIGURE, where droplet 10 of a fluid composition has been deposited upon a basic substrate 20. The bulk 30 of the droplet is surrounded by a primary film 40. The applicants currently believe that water and the relatively volatile acid evaporates relatively quickly from the very thin primary film of a droplet of the fluid composition deposited on the silicated substrate. The net effect of such evaporation is to increase the relative percentage of non-neutralized basic sites of the copolymer which are present in the primary film in comparison to the bulk of the liquid droplet. These non-neutralized basic sites will be repulsed by the basic sites present on the surface of the silicated aluminum substrate.

The electron pair repulsion between the free tertiary amine groups of the polymer and the basic sites of the silicated aluminum substrate tend to reduce the expansion of the liquid droplet, which results in a smaller dot diameter in relation to the diameter of the liquid droplet, thereby imparting superior resolution to the ink receptive composition. In this first mechanism, the silicated aluminum substrate and the partially neutralized basic copolymer of the fluid composition are "interfacially matched" to provide for such repulsion.

A second mechanism, as also shown in the FIGURE, is believed to occur in the bulk of the liquid droplet. Relatively little evaporation of the acid and water occurs in the bulk of the liquid droplet. Thus, the proportion of acid neutralized basic sites in the bulk of the droplet is greater than in the primary film. It is theorized that an acid/base double salt substitution reaction occurs between the acid sites present in the partially neutralized basic copolymer in the bulk of the ink droplet and the basic sites present on the surface of the silicated substrate. In this second mechanism, the silicated aluminum substrate and the partially neutralized basic copolymer of the fluid composition are "interfacially matched" to provide a proton from the neutralized amine group which is attracted by the basic site of the sodium silicate, as shown in the FIGURE. This second mechanism is currently believed to be responsible for the superior adhesion and durability of the resulting ink receptive layer, and may explain why a crosslinking step is not required in the present invention. Thus, the ink-receptive layer is "thermoplastic" in the sense that it is not covalently crosslinked.

When the printable media is prepared by ink jet application of the fluid composition onto a printing plate substrate, the resulting ink receptive layer comprises a plurality of dots forming a desired image to be printed. By proper selection of a basic substrate and the fluid composition (acid/base interfacial matching), the dots can have an average ratio (i.e. dot diameter:droplet diameter) of not more than 2.5, preferably not more than 2.2, where droplet diameter is defined as the size of a droplet of an fluid composition formed by the ink jet printer employed to apply the ink receptive layer. The lower dot the average ratio, the higher the resolution.

In a preferred embodiment, the printing plate substrate is pretreated with a desorbable fluorosurfactant prior to ink jet application of the fluid composition.

The fluorosurfactant is preferably applied by immersion of the printable media substrate in an aqueous solution of the fluorosurfactant for a time, typically one minute, which is effective to permit adsorption of the fluorosurfactant upon the substrate. The fluorosurfactant concentration may range from 0.001 to 1 percent, preferably 0.05 to 0.2 weight percent of the solution. The substrate is then rinsed under tapwater for approximately one minute to remove excess fluorosurfactant. The rinsed plate is then dried, either at room temperature or in an oven.

The fluorosurfactant is believed to exist as a monolayer on the substrate surface, with a coating thickness of about 0.002 micron. After imaging, the resulting printable media is washed with a plate cleaner to remove (desorb) the fluorosurfactant from the non-imaged areas. Thus, by "desorbable" what is meant is that the fluorosurfactant will not only readily adsorb onto the substrate, but can also be readily removed from the non-image areas of the printable media after imaging.

The desorbable fluorosurfactant is preferably selected from $C_{10}F_{21}SO_3^-NH_4^+$, $C_8F_{17}SO_2NH(C_3H_6)N^+(CH_3)_3I^-$, $C_8F_{17}SO_2NC_2H_5(CH_2CH_2O)_xH$ where x is 0 to 10. These fluorosurfactants are commercially available.

The printable media of the present invention may be used as a lithographic master plate to print numerous copies of the same image using conventional equipment, inks, substrates and techniques well known to those of ordinary skill in the art.

The following examples illustrate preferred embodiments of the invention, and are not intended to limit the scope of the invention in any manner whatsoever. Changes may be made without departing from the scope of the invention. The temperatures are in degrees centigrade and the percentages, unless noted otherwise, are by weight.

EXAMPLE 1

Preparation of a Partially Neutralized Basic Copolymer

A mixture of methyl isobutyl ketone ("MIBK", 300 g), n-dodecylmercaptan (0.75 g) and VAZO 88 (1.5 g) was stirred, nitrogen-blanketed and heated to reflux temperature. Then a blend of dimethyl amine ethyl methacrylate (94 g), methyl methacrylate (216 g) and MIBK (20 g) was added dropwise over 2.5 hours at as constant a rate as possible. A solution of VAZO 88 (1.5 g) in MIBK (20 g) was added thirty minutes later. Heating and stirring were discontinued about 4 hours later, resulting in a clear, golden solution. The solution was concentrated removing about 166.2 g MIBK by distillation. At about 80° C., water (559 g) was added and azeotropic distillation began, and a pasty mass resulted. When the temperature of the pasty mass reached 90° C., water (55 g) and formic acid (19 g) were added, resulting in a much more fluid dispersion. Azeotropic distillation of this dispersion was continued until its temperature reached 99° C. and very little MIBK was being removed.

The product was an opaque dispersion of a 28% DMAEMA/72% MMA copolymer 75% neutralized with formic acid. The dispersion had a pH of 6.20, a percent solids of 33.2, and a Brookfield viscosity of 16900 centipoise at 5 rpm.

EXAMPLE 2

Formulation of Fluid Compositions

Fluid compositions were prepared by adding an appropriate amount of the partially neutralized, basic copolymer dispersion of Example 1 to deionized water which additionally contained a non-ionic surfactant and, in some cases, a glycerol humectant. The mixture was stirred under heat to ensure homogeneous mixing, and filtered through a 1 micron pore size filter. The resulting fluid compositions are set forth below in Table 1 below:

TABLE 1

| Fluid Composition | Cationic Polymer | Non-ionic Surfactant | Deionized Water | Humectant |
|---|---|---|---|---|
| II-1 | 3% | 0.30% SURFYNOL 465[1] | 96.7% | — |
| II-2 | 3% | 0.30% SURFYNOL 465 | 94.7% | 2% glycerol |
| II-3 | 3% | 0.60% SURFYNOL 465 | 93.6% | 3% glycerol |
| II-4 | 4.5% | 0.20% SURFYNOL 465 | 93% | 2.25% tripropylene glycol |
| II-5 | 3% | 0.2% SURFYNOL 465 | 95.3% | 1.5% tripropylene glycol |

[1]Non-ionic surfactant conforming to the following formula and commercially available from Air Products Co. of Bethleham, PA under the SURFYNOL 465 trademark:

TABLE 1-continued

| Fluid Composition | Cationic Polymer | Non-ionic Surfactant | Deionized Water | Humectant |
|---|---|---|---|---|

$$CH_3-CH(CH_3)-CH_2-C(CH_3)(O-CH_2-CH_2-O-H)_m-C\equiv C-C(CH_3)(O-CH_2-CH_2-O-H)_n-CH_2-CH(CH_3)-CH_3$$

(m + n = 10)

EXAMPLE 3
Evaluation of Ink Dot Spread

One of the fluid compositions prepared in Example 2 above was evaluated for ink dot spread when applied to a variety of pre-treated printing plate substrates according to the following procedure: A 10 μl chromatographic microsyringe with a flat needle was filled with the liquid ink receptive composition to be studied. A droplet was formed at the needle extremity and dropped on the printing plate substrate surface from a height of about 3 mm. After deposition of 4 or 5 drops, the paste was dried in an oven or at room temperature, and the resulting dot diameters were measured manually and averaged. In the case of ovoid spreading, the smaller dot diameter was recorded. In the case of heterogeneous spreading, either no value was recorded or a best estimate was used.

The printing plate substrates were each based on 6-gauge aluminum oxide which were subjected to various conventional surface treatments well known to those skilled in the art. These treatments result in different roughnesses, topologies and surface chemistries. Table 2 lists the substrates employed in the ink drop test:

TABLE 2

Substrate Samples Employed For the Ink Drop Test

| Substrate Refs. | Surface Treatment | Interlayer | Surface Property |
|---|---|---|---|
| CHB-Sil | Chemically grained + Basic etched | Silicate | Basic |
| CHB-PVPA | Chemically grained + Basic etched | PVPA | Acidic |
| EG-Sil | Electro-grained | Silicate | Basic |
| EG-PVPA | Electro-grained | PVPA | Acidic |
| PG-Sil | Pumice-grained | Silicate | Basic |
| PG-PVPA | Pumice-grained | PVPA | Acidic |

CHB Plates:

CHB refers to chemical graining in a basic solution. After a matte finishing process, a solution of 50 to 100 g/liter NaOH is used during graining at 50 to 70° C. for 1 minute. The grained plate is then anodized using DC current of about 8 A/cm for 30 seconds in an $H_2O_4$ solution (280 g/liter) at 30° C. The anodized plate is then coated with an interlayer.

EG Plates:

EG refers to electrolytic graining. The aluminum oxide plate is first degreased, etched and subjected to a desmut step (removal of reaction products of aluminum and the etchant). The plate is then electrolytically grained using an AC current of 30 $A/cm^2$ in a hydrochloric acid solution (10 g/liter) for 30 seconds at 25° C., followed by a post-etching alkaline wash and a desmut step. The grained plate is then anodized using DC current of about 8 $A/cm^2$ for 30 seconds in a $H_2SO_4$ solution (280 g/liter) at 30° C. The anodized plate is then coated with an interlayer.

PG Plates:

PG refers to "pumice grained". The aluminum oxide plate is first degreased, etched and subjected to a desmut step. The plate is then mechanically grained by subjecting it to a 30% pumice slurry at 30° C., followed by a post-etching step and a desmut step. The grained plate is then anodized using DC current of about 8 $A/cm^2$ for 30 seconds in an $H_2SO_4$ solution (280 g/liter) at 30° C. The anodized plate is then coated with an interlayer.

DS Plates:

DS means "double sided smooth". The aluminum oxide plate is first degreased, etched and subjected to a desmut step. The smooth plate is then anodized (without any roughening step) and coated with an interlayer.

"PVPA" is polyvinylphosphoric acid. The anodized plate is immersed in a PVPA solution (1.4 g/liter) for 15 seconds at 40° C. The coated plate is then washed with deionized water and dried at room temperature.

"Silicate" means the anodized plate is immersed in a sodium silicate solution (80 g/liter), commercially available under the trademark N-38 from the Philadelphia Quartz Co. at 75° C. for one minute. The coated plate is then rinsed with deionized water and dried at room temperature.

Fluid composition II-2 was used to evaluate these substrates using the ink drop test described above to evaluate dot diameter. Test results are set forth in Table 3 below. Some of the substrates were pretreated with a cationic, non-ionic or anionic fluorosurfactant prior to the ink drop test. The cationic fluorosurfactant was $C_8F_{17}SO_3^-NH_4^+$, which is commercially available under the trademark FC-120 from 3M Corporation. The non-ionic fluorosurfactant was $F(CF_2CF_2)_{3-8}CH_2CH_2O(CH_2CH_2O)_xH$, which is commercially available under the trademark FC-170C. from 3M Corporation. The cationic fluorosurfactant was $C_8F_{17}SO_2NH(C_3H_6)N^+(CH_3)_3I^-$, which is commercially available under the trademark FC-135 from 3M Corporation.

TABLE 3

| | Dot Diameter in Microns | | | | | |
|---|---|---|---|---|---|---|
| Fluid Composition II-2 | CHB-Silicate | EG-Silicate | PG-Silicate | CHB-PVPA | PG-PVPA | PG-PVPA |
| Without Surfactant Pretreatment | 5 | 6.5 | 6 | 6.5 | 8 | 7 |
| Cationic Surfactant | 3 | 3 | 3 | 4.5 | 9 | 5 |
| Non-ionic Surfactant | 5.5 | 7 | 5.5 | 5 | 7.5 | 5 |
| Anionic Surfactant | 6 | 7 | 7 | 7.5 | 8 | 4.5 |

EXAMPLE 4
Evaluation of Ink Dot Spread

Three different inventive fluid compositions prepared in Example 2 were applied to various "acidic" or "basic" printing plate substrates to illustrate the advantages of interfacial acid/base matching of the substrate and the ink. The printing plate substrates were aluminum plates which had been subjected to various surface pretreatments discussed above using techniques and equipment well known to those of ordinary skill in the art.

The surface treated aluminum plates were taped onto A4 paper sheets and imaged using two Epson ink jet printers. EPSON1 is a commercially available Epson Stylus ESC/P2 printer having an ink jet drop volume of approximately 35 picoliters. EPSON2 is a commercially available Epson 800 printer having an ink jet drop volume of approximately 14 picoliters.

The imaged plates were dried in an oven at 120° C. for one minute, and then manually inked using a white cloth impregnated with a red oleophilic ink formulation and tap water to simulate the ink and fountain solution contact of an offset lithographic press.

"Resistance" in Table 4 below is an initial indication of adhesion of the polymer to the substrate during the manual plate inking step. "Dot diameter" is an average value based on over 30 dots, and was determined by optical microscopy and commercially available Image Pro computer software. "Specific Ratio" is an average ratio of dot diameter:droplet diameter, where droplet diameter is defined as the size of a droplet formed by the ink jet printer employed to apply the fluid composition to the substrate, and dot diameter is the size of the dot formed on the substrate by the ink jet applied, dried droplet.

EXAMPLE 6

Long Term Stability

Fluid composition II-3 was stored in the Epson Stylus ESC/P2 printer (EPSON1) for over 5 months without clogging and without visible problems. Fluid composition II-5 was stored in an Epson 800 printer (EPSON2) for 2 months without any apparent problem. These results indicate that the fluid compositions possess good compatibility with the Epson ink jet print heads.

EXAMPLE 7

Effect of Partial Neutralization

Three fluid compositions were prepared using the basic copolymer prepared in Example 1, but partially neutralized at 50%, 75% and 100% with formic acid, respectively. These compositions were then evaluated by the ink drop test as described in Example 3. Test results are shown in Table 6 below:

TABLE 4

| Substrate | Fluid Comp. | Printer | Resolution | Dot diam. ($\mu$m) | Resistance | Average Ratio |
|---|---|---|---|---|---|---|
| CHB Silicated | II-3 | EPSON1 | GOOD | 84.0 | YES | 2.07 |
| CHB Silicated | II-5 | EPSON2 | GOOD | 62.3 | YES | 2.08 |
| PG | II-5 | EPSON2 | GOOD | 57.8 | YES | 1.93 |
| PG Silicated/8 g/Bside | II-5 | EPSON2 | GOOD | — | YES |  |
| PG Silicated/8 g/Bside | II-5 | EPSON2 | GOOD | 60.3 | YES | 2.02 |
| PG Silicated/6 g/Int | II-4 | EPSON2 | BAD | — | YES |  |
| PG Silicated/6 g/Ext | II-3 | EPSON1 | GOOD | 84.2 | YES | 2.07 |
| PG Silicated/6 g/Ext | II-4 | EPSON2 | GOOD | 61.9 | YES | 2.07 |
| EG Silicated | II-4 | EPSON2 | GOOD | 57.4 | YES | 1.92 |
| EG Silicated | II-5 | EPSON2 | GOOD | 62.0 | YES | 2.07 |
| DS Silicated (no graining) | II-3 | EPSON1 | GOOD | 74.2 | NO | 1.83 |
| DS Silicated (no graining) | II-4 | EPSON2 | GOOD | 55.3 | NO | 1.83 |
| EG PVPA | II-5 | EPSON2 | BAD | — | YES |  |
| T71 PVPA | II-5 | EPSON2 | BAD | 134.0 | YES | 4.48 |
| CHB PVPA | II-3 | EPSON1 | BAD | 112.0 | YES | 2.76 |
| EG as Anodized | II-4 | EPSON1 | NO | 205.0 | YES | 5.05 |

EXAMPLE 5

Runlength Evaluation

Three lithographic master printing plates were prepared by applying different fluid compositions to pretreated printing plate substrates using the EPSON1 or EPSON2 printers. After drying in an oven at 120° C. for 1 minute, two printing plates were run on the press for 100,000 impressions, while the third plate was limited to about 1,000 impressions due to limited press-time. No decrease in density was observed on the 10 and 50% raster during the press runs for the first two plates. The third plate is expected to exhibit the same level of resistance as the first and second lithographic master plates.

| Substrate | Ink | Printer | Run-Length |
|---|---|---|---|
| CHB-Silicated | II-3 | Epson 1 | >100,000 |
| CHB-Silicated | II-5 | Epson 2 | >100,000 |
| PG Silicated | II-5 | Epson 1 | >1,000 |

TABLE 6

| % Neutralization | Substrate | Ink Drop Diameter |
|---|---|---|
| 50% | CHB-Silicate | 5 |
| 50% | EG-Silicate | 6.5 |
| 50% | PG-Silicate | 5.5 |
| 50% | CHB-PVPA | 6 |
| 50% | EG-PVPA | 8 |
| 50% | PG-PVPA | 7 |
| 75% | CHB-Silicate | 5 |
| 75% | EG-Silicate | 6.5 |
| 75% | PG-Silicate | 6 |
| 75% | CHB-PVPA | 6.5 |
| 75% | EG-PVPA | 8 |
| 75% | PG-PVPA | 7 |
| 100% | CHB-Silicate | 6 |
| 100% | EP-Silicate | 7.5 |
| 100% | PG-Silicate | 6.5 |
| 100% | CHB-PVPA | 6.5 |
| 100% | EG-PVPA | 8 |
| 100% | PG-PVPA | 7 |

A significant increase in ink dot spreading was observed with respect to the silicate plates as the basic polymer became more and more neutralized. However, no similar effect was observed for the PVPA plates. It is believed this is due to the more amphoteric nature of the PVPA surface.

Those skilled in the art having the benefit of the teachings of the present invention as hereinabove set forth, can effect numerous modifications thereto. These modifications are to be construed as being encompassed with the scope of the present invention as set forth in the appended claims.

We claim:

1. A fluid composition suitable for ink jetting upon a substrate, consisting essentially of:

(a) a copolymer having a low surface energy and a plurality of tertiary amine sites, wherein said tertiary amine sites are at least partially neutralized with an acid, wherein said copolymer is selected from the group consisting of a polyacrylate, a polyamide, and a styrenated polyacrylate;

(b) a nonionic or cationic surfactant; and (c) water.

2. The fluid composition of claim 1, wherein said copolymer is prepared from a comonomer having the following formula:

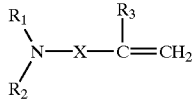

wherein $R_1$ is hydrogen or $C_{1-5}$ alkyl;

$R_2$ is $C_{1-5}$ alkyl;

$R_3$ is hydrogen or methyl;

X is —$C_6H_4$— or

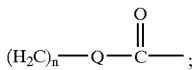

n is 2 to 6; and

Q is oxygen or N—H.

3. The fluid composition of claim 2, wherein said comonomer is selected from the group consisting of an acrylate, an acrylamide, and a styrene.

4. The fluid composition of claim 3, wherein said acrylate is selected from the group consisting of dimethylaminoethyl acrylate, dimethylaminoethyl methacrylate, diethylaminoethyl acrylate, diethylaminoethyl methacrylate, di(t-butyl)aminoethyl acrylate, and di(t-butyl)aminoethyl methacrylate.

5. The fluid composition of claim 3, wherein said acrylamide is dimethylamino-propyl methacrylamide.

6. The fluid composition of claim 3, wherein said styrene is selected from the group consisting of p-dimethylamino styrene and diethylaminostyrene.

7. The fluid composition of claim 1, wherein said copolymer is a polyamide prepared from a comonomer having a tertiary amino site in its backbone.

8. The fluid composition of claim 1, wherein said acid is a compound which conforms to one of the formulae in the group consisting of H—$(CH_2)_n$—COOH and

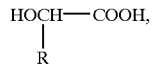

wherein

R is hydrogen, —CH, or —$CH_2CH_3$; and n is a number from 0 to 6.

9. The fluid composition of claim 8, wherein said acid is selected from the group consisting of formic acid, acetic acid, lactic acid, and glycolic acid.

10. The fluid composition of claim 1, wherein said surfactant is selected from the group consisting of acetylenic glycols, ethoxylated glycols, ethoxylated/propoxylated block copolymers and sorbitan esters.

11. The fluid composition of claim 1, further comprising a humectant.

12. The fluid composition of claim 11, wherein said humectant is selected from the group consisting of glycerol, ethylene glycol, diethylene glycol, triethylene glycol, propylene glycol, dipropylene glycol, tripropylene glycol, ethylene glycol monomethyl ether, diethylene glycol monomethyl ether, triethylene glycol monomethyl ether, propylene glycol monomethyl ether, dipropylene glycol monomethyl ether and tripropylene glycol monomethyl ether.

13. The fluid composition of claim 12, wherein said humectant is glycerol.

14. The fluid composition of claim 1, wherein said copolymer has a maximum surface energy of 50 dynes/cm.

15. The fluid composition of claim 14, wherein the surface energy of said copolymer is from 20 to 50 dynes/cm.

16. The fluid composition of claim 1, wherein said copolymer is present in an amount of from 0.1 to 30 weight percent based upon the total weight of the composition.

17. The fluid composition of claim 16, wherein said surfactant is present in an amount of from 0.001 to 5 weight percent based upon the total weight of the composition.

18. The fluid composition of claim 17, wherein (a) said copolymer is present in an amount of from 0.1 to 2 weight percent based upon the total weight of the composition; and (b) said surfactant is present in an amount of from 0.05 to 1 weight percent based upon the total weight of the composition, and (c) said water is present in an amount of from 97 to 98.9 weight percent based on the total weight of the composition.

19. The fluid composition of claim 1, further comprising (d) a humectant selected from the group consisting of glycerol, ethylene glycol, diethylene glycol, triethylene glycol, propylene glycol, dipropylene glycol, tripropylene glycol, ethylene glycol monomethyl ether, diethylene glycol monomethyl ether, triethylene glycol monomethyl ether, propylene glycol monomethyl ether, dipropylene glycol monomethyl ether and tripropylene glycol monomethyl ether.

20. The fluid composition of claim 19, wherein said humectant is present in an amount of from 1 to 10 weight percent, based on the total weight of the composition.

21. A lithographic printing member, comprising:

(a) an aluminum substrate; and (b) an imagewise deposited ink receptive, thermoplastic image layer supported on said substrate, wherein said ink receptive layer contains a copolymer having a low surface energy and a plurality of tertiary amine sites, said amine sites being at least partially neutralized with an acid.

22. The lithographic printing member of claim 21, further comprising an interlayer between said substrate and said ink receptive layer, said interlayer comprising a plurality of sodium silicate sites.

23. The lithographic printing member of claim 22, wherein at least a portion of said sodium silicate sites have been neutralized with an acid.

24. The lithographic printing member of claim 22, wherein said substrate is a roughened aluminum.

25. The lithographic printing member of claim 22, further comprising a desorbable fluorosurfactant layer positioned between said interlayer and said ink receptive layer.

26. The lithographic printing member of claim 25, wherein said fluorosurfactant is selected from the group consisting of $C_{10}F_{21}SO_3^-NH_4^+$, $C_8F_{17}SO_2NH(C_3H_6)N^+(CH_3)_3I^-$, $C_8F_{17}SO_2NC_2H_5(CH_2CH_2CH_2O)_xH$ where x is 0 to 10.

27. The lithographic printing member of claim 21, wherein said ink receptive layer comprises a plurality of dots applied by ink jet printing, said dots having an average ratio of not more than 2.5.

28. The lithographic printing member of claim 27, wherein said average ratio is not more than 2.2.

29. A method for preparing a printable media comprising:
  (a) imagewise applying a fluid composition onto a substrate having at least one basic surface by means of an ink jet printing apparatus, wherein said fluid composition contains a copolymer having a plurality of tertiary amine sites, said amine sites being at least partially neutralized with an acid, and
  (b) drying said fluid composition.

30. The method of claim 29, wherein said basic surface of said substrate has been roughened prior to being rendered basic.

31. The method of claim 30, wherein the roughened surface of said substrate is rendered basic by treating it with sodium silicate.

32. The method of claim 29, wherein said surface of said substrate is contacted with an acid prior to coating said surface with said ink receptive layer.

33. The method of claim 32, wherein said acid is sulfuric acid.

34. The method of claim 29, wherein said substrate surface is coated with a desorbable fluorosurfactant prior to applying said fluid composition.

35. The method of claim 29, wherein said fluid composition is formed from a composition which consists essentially of:
  (a) a copolymer having a plurality of tertiary amine sites, said amine sites being at least partially neutralized with an acid;
  (b) a surfactant;
  (c) humectant; and
  (d) water.

36. A printable media prepared according to the method of claim 29.

* * * * *

UNITED STATES PATENT AND TRADEMARK OFFICE
CERTIFICATE OF CORRECTION

PATENT NO.    : 6,455,132 B1
DATED         : September 24, 2002
INVENTOR(S)   : Patrice M. Aurenty et al.

It is certified that error appears in the above-identified patent and that said Letters Patent is hereby corrected as shown below:

Column 15,
Line 18, replace "$(CH_2CH_2CH_2O)_xH$" with -- $(CH_2CH_2O)_xH$ --

Signed and Sealed this

Eighth Day of April, 2003

JAMES E. ROGAN
*Director of the United States Patent and Trademark Office*